United States Patent [19]

Greene

[11] Patent Number: 5,050,787
[45] Date of Patent: Sep. 24, 1991

[54] METHOD FOR REMOVING FLASHING FROM BLOW MOLDED BOTTLES

[76] Inventor: Thomas F. Greene, 2 Harrison Eaton La., Amesbury, Mass. 01913

[21] Appl. No.: 502,574

[22] Filed: Mar. 30, 1990

Related U.S. Application Data

[62] Division of Ser. No. 351,950, May 15, 1989, Pat. No. 4,944,667.

[51] Int. Cl.[5] .................... B29C 49/04; B29C 49/50; B29C 49/74
[52] U.S. Cl. ............................ 225/1; 225/97; 83/914; 264/161; 264/524; 264/536; 425/806
[58] Field of Search ............ 264/536, 161, 524, 525; 425/527, 806, 806 R; 83/914; 225/1, 97, 102

[56] References Cited

U.S. PATENT DOCUMENTS

| | | | |
|---|---|---|---|
| 3,040,376 | 6/1962 | Elphee | 264/161 |
| 3,145,243 | 8/1964 | Hagen | 264/161 |
| 3,382,531 | 5/1968 | Hager | 83/914 |
| 3,464,084 | 9/1969 | Thompson | 83/914 |
| 3,736,091 | 5/1973 | Reilly | 425/326 |
| 4,459,095 | 7/1984 | Rohr et al. | 425/527 |
| 4,614,018 | 9/1986 | Krall | 264/536 |
| 4,834,643 | 5/1989 | Klinedinst et al. | 264/536 |

FOREIGN PATENT DOCUMENTS 2703446  8/1978  Fed. Rep. of Germany ...... 264/536

*Primary Examiner*—Jan H. Silbaugh
*Assistant Examiner*—Catherine Timm
*Attorney, Agent, or Firm*—Samuels, Gauthier & Stevens

[57] ABSTRACT

A method for removing flashing from a low density plastic blow molded bottle which includes nesting the bottle from which the flashing is to be removed such that substantially its entire surface is engaged in the housing, to facilitate the removal of the flashing from the neck of the bottle without damage to the bottle. The flashing is secured with jaws at the juncture of the flashing with the bottle to remove the flashing without damage to the bottle.

3 Claims, 6 Drawing Sheets

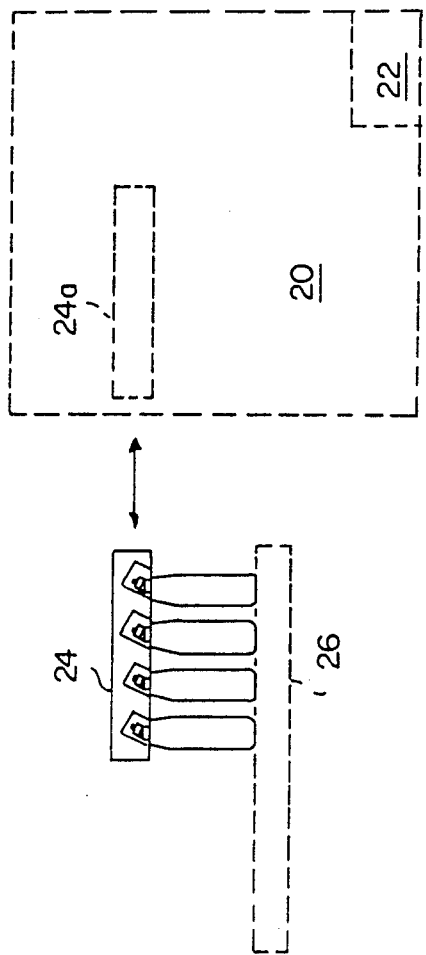
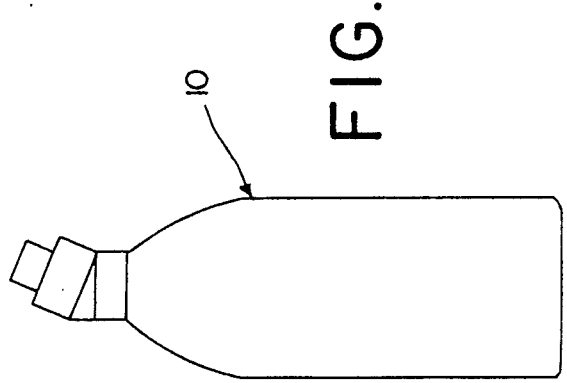
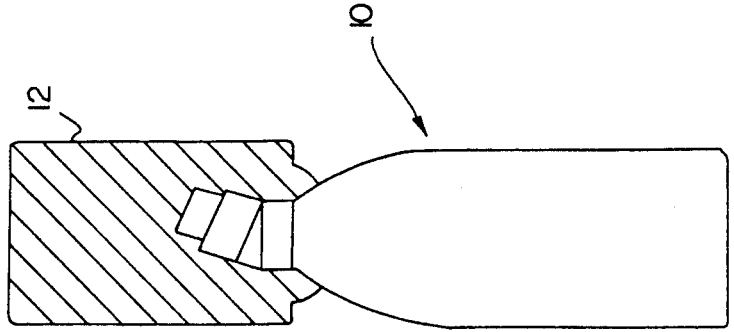

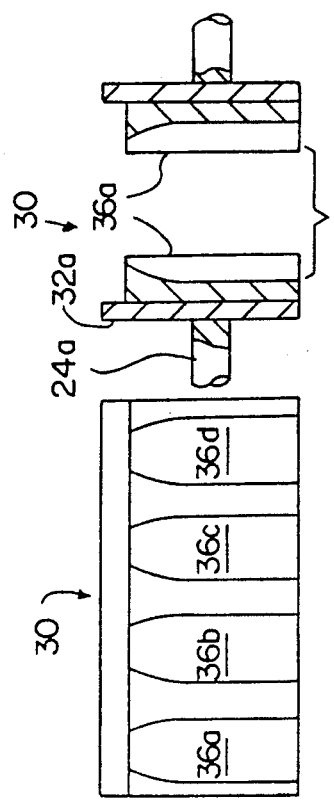
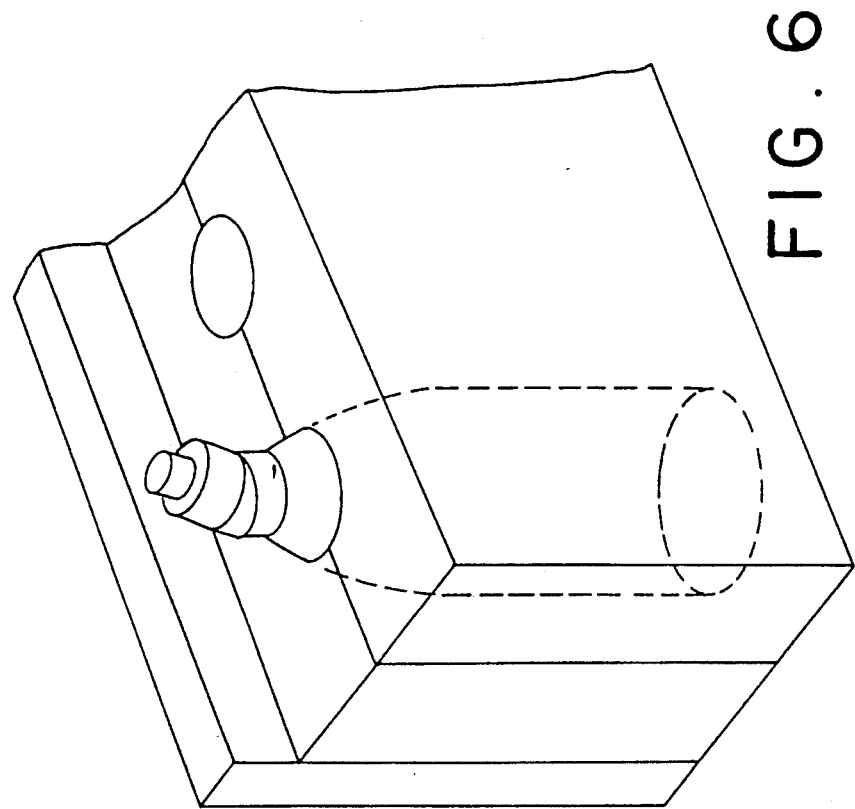

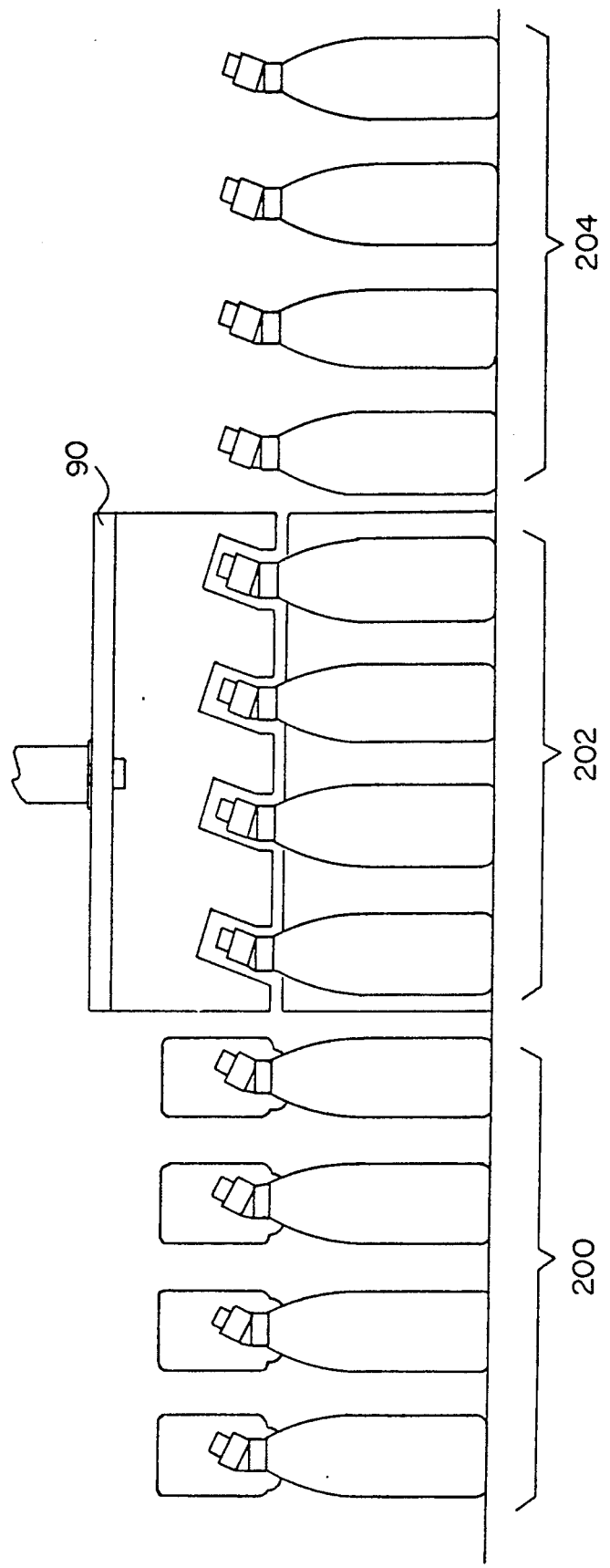

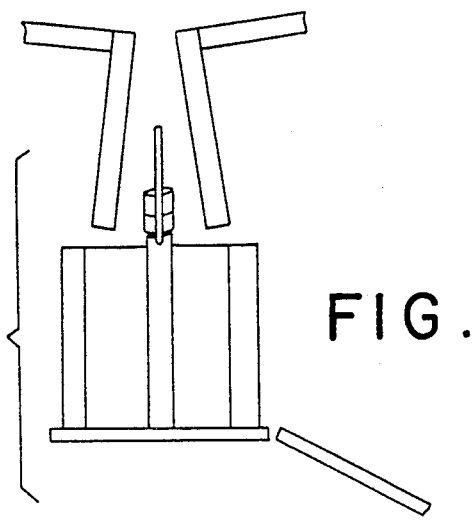
FIG. 11a
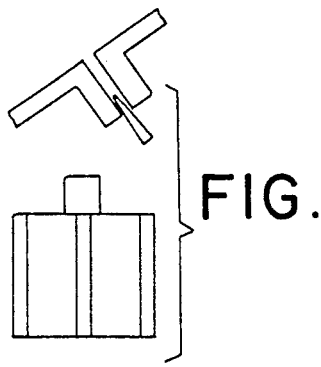
FIG. 11c
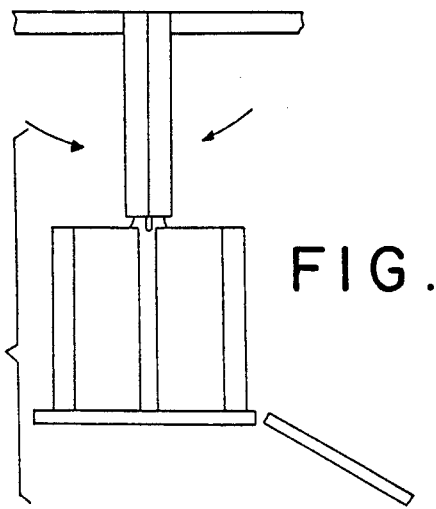
FIG. 11b
FIG. 11e
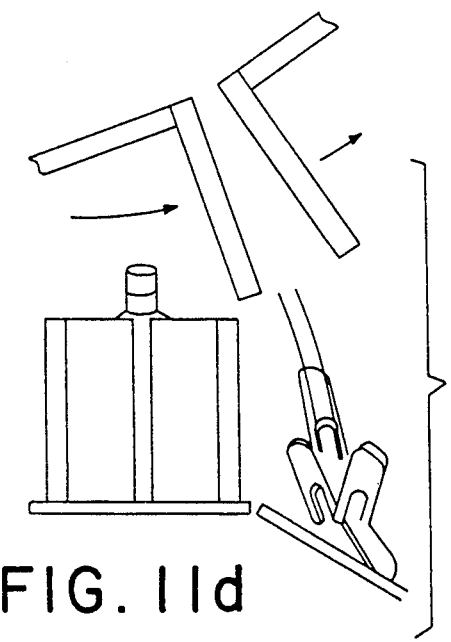
FIG. 11d
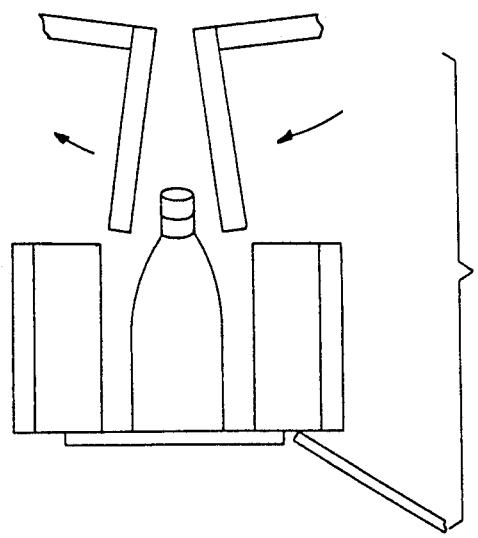

METHOD FOR REMOVING FLASHING FROM BLOW MOLDED BOTTLES

This is a divisional of co-pending application Ser. No. 351,950, filed on May 15, 1989, now U.S. Pat. No. 4,944,667.

BACKGROUND AND SUMMARY OF THE INVENTION

The invention relates to an apparatus and method for removing flashing from plastic bottles.

In many bottle manufacturing operations, plastic is extruded and blown within a mold to form the shape of a bottle. The bottle is filled. Dies then engage the upper portion of the filled bottle to form an upper neck and to seal the bottle One such application in which these bottles are formed is disposable, low-density, polyethylene douche bottles.

There are two separate flashings that must be removed before the bottle can be packaged, flashing on the bottom of the bottle and flashing on the neck and top of the bottle. Pins pass through the bottom flashing (The pins are formed integrally with the die). When the bottle is removed from the die, the flashing is removed by these pins.

The upper flashing is presently removed by hand. In some applications with high density or rigid plastic bottles, the flashing about the neck is removed by clamps or the like. However, this is not feasible with low-density polyethylene because the clamping systems available in the flashing.

The present invention comprises an apparatus and method wherein the flashing from the neck or top of a bottle, particularly a low-density plastic bottle, is removed without damaging the bottle.

Broadly the invention comprises a lower housing assembly and an upper clamping assembly.

The housing assembly has two facing walls each characterized by concave recesses. The walls are adapted for movement between open and closed positions. The walls, when closed, define nests. In its closed position, the housing engages and supports the bottles, the nests covering a substantial portion of the bottle to impart dimensional stability to the bottle from which the flashing is being removed. These nests prevent tearing of the bottle when the flashing is removed.

The clamping assembly includes facing plates which clamp together when in a closed position. Formed in the plates are opposed sets of jaws, each set functions in combination with a bottle held in a nest. Openings are defined between adjacent jaws in each plate. The openings in the plate are aligned with one another and they are in register with the top portion of a bottle. The jaws defining these openings are adapted to clamp the flashing, their inner edges following the juncture of the flashing and the top of the bottle.

After the bottles have been capped and sealed, the walls of the housing close to engage the bottles therebetween. The housing assembly moves the bottles to the clamping assembly. The jaws close and clamp the flashing. The jaws move away from the bottles to remove the flashing and the jaws then open, discarding the flashing.

BRIEF DESCRIPTION OF THE DRAWINGS

FIG. 1 is a perspective view of a bottle showing the top flashing;

FIG. 2 is a perspective view of a bottle with the flashing removed;

FIG. 3 is a view in dotted lines of a prior art bottle forming machine;

FIG. 4 is a front view of a housing assembly embodying the invention;

FIG. 5 is a side view of a wall;

FIG. 6 is a perspective view of the housing assembly;

FIG. 10 is a schematic of the bottles as they move into and through the clamping assembly of the invention to have flashing removed; and FIG. 11a, 11b, 11c, 11d and 11e are schematic illustrations of the sequential steps in the operation of the apparatus.

DESCRIPTION OF THE PREFERRED EMBODIMENT

Figure 7:
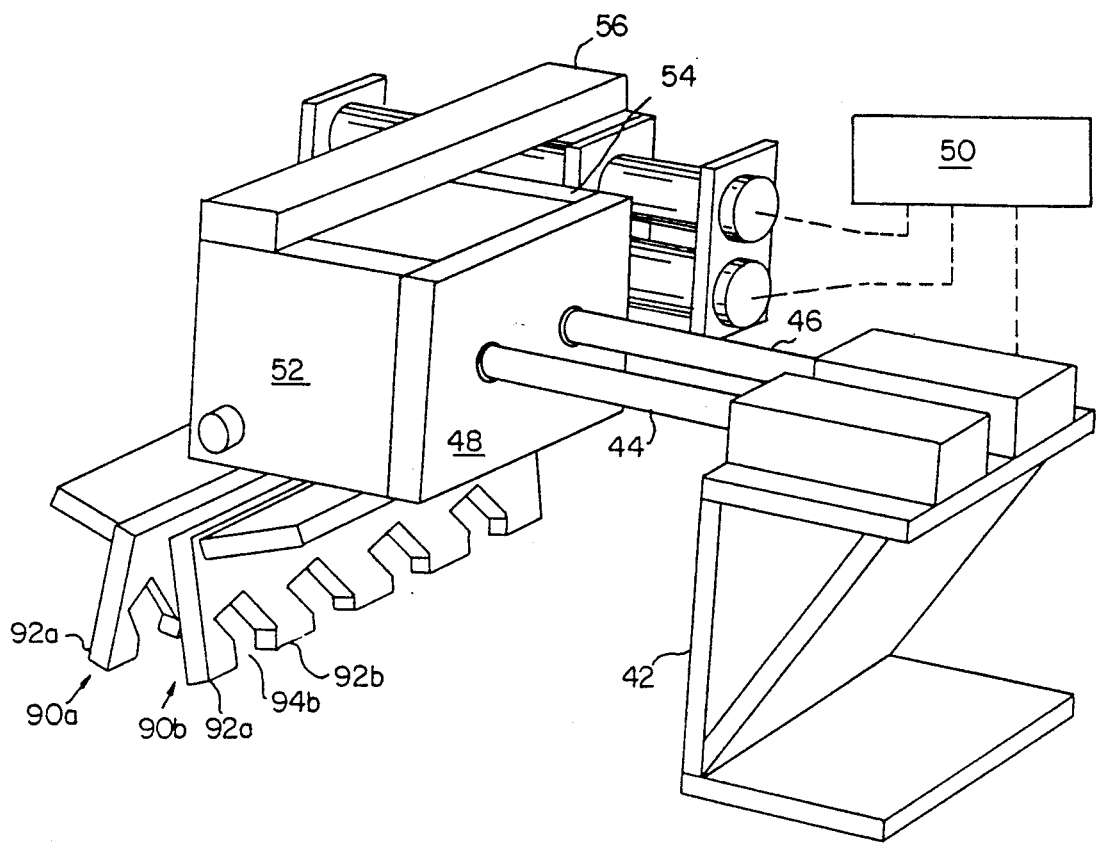
FIG. 7 is a perspective view of a system embodying the clamping assembly of the invention.

The present invention is used in an existing assembly line. Low-density polyethylene bottles are formed by extruding plastic, blowing the plastic in a mold to form the bottle, filling the bottle and then forming the upper neck and sealing. The bottles follow one another on the assembly line and at the point they reach the clamping assembly of the present invention, the bottom flashing has been removed and the top flashing remains as shown in FIGS. 1 and 10.

The invention will be described with reference to inventive modifications to a standard automatic liquid packaging machine, such as available from Willer Engineering, Chicago, Illinois.

A bottle 10 is shown in FIG. 1, the flashing 12 is lined. In FIG. 2, the flashing has been removed.

Referring to FIG. 3, a prior art machine is shown in dotted lines at 20, and for purposes of this disclosure, comprises the structure to extrude the material to form the plastic bottle, to fill the plastic bottle and to seal and cap the plastic bottle all within the machine. The necessary controls to accomplish these functions are represented schematically at 22. The machine includes opposed transfer arms 24. When the bottles are completely formed, these transfer arms are adapted to close and engage the flashing formed on the top of the bottle to move the bottles, for example four at a time, eight at a time, etc., to a conveyor belt 26 wherein the arms 24 open to release the bottles and then return to the machine to acquire the next group of bottles. The bottles travel on the conveyor belt 26. Where the bottles are formed from low-density material, the upper flashing is removed by hand.

In the present invention, the prior art machine is modified basically in two ways. Firstly, the arms 24 of the prior art machine are removed. Walls are secured to the structure which opens and closes the arms. Secondly, a clamping assembly is provided to remove the flashing. This assembly includes its own controls to function is synchronism with the movement of the walls of the housing.

Referring to FIGS. 4 and 5, a housing assembly is shown generally at 30. Both sides of the housing assembly being identical, only one side will be described in detail. The housing comprises a wall 32a secured on one side to the prior art structure 24a. The other side of the wall 32a is characterized by concave recesses 36a–36d.

These recesses 36a–36d are shown more clearly in FIG. 5.

Referring to FIG. 6, when the recesses are closed upon one another, they define nests within which the bottles are secured. The nests prevent the bottle from being torn when the flashing is removed.

Figure 8:
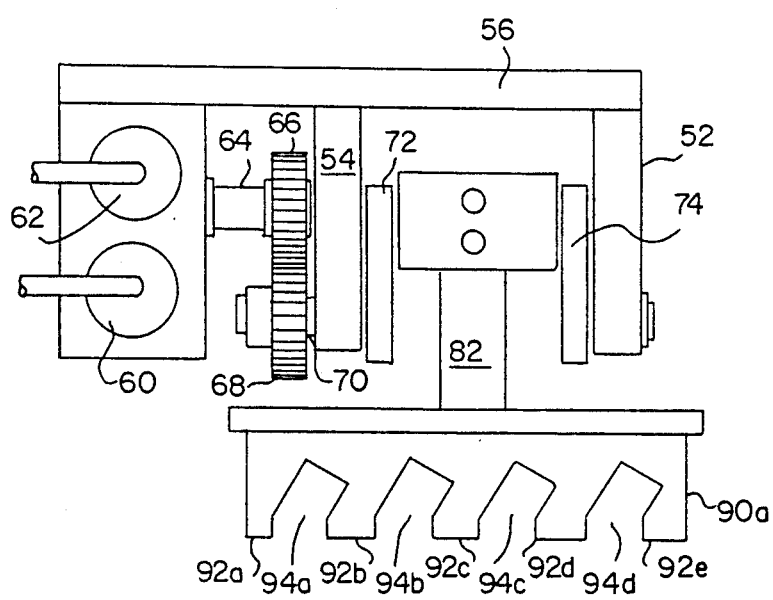
FIG. 8 is a side view of the assembly of FIG. 7.
Figure 9:
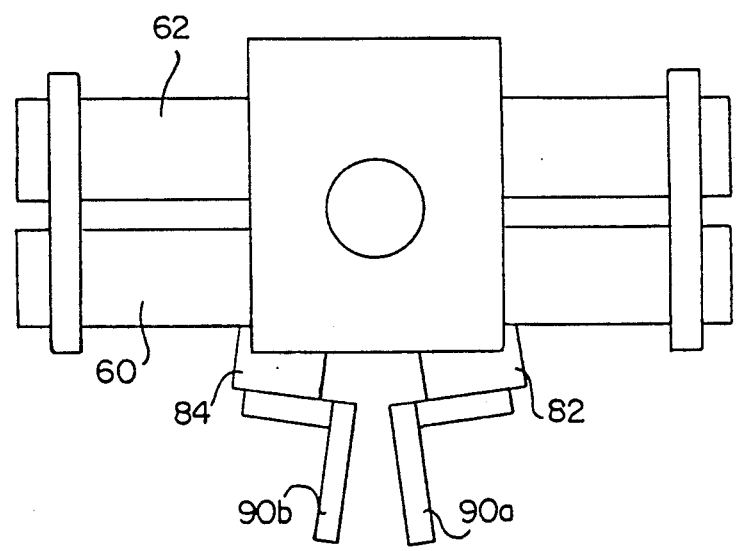
FIG. 9 is a rear view of the assembly of FIG. 8.

A clamping assembly 40 is shown in FIGS. 7–9. The assembly includes a support stand 42 to which is secured dual pneuamtic pistons 44 and 46. The pistons are secured to a support plate 48 and communicate with a control panel 50. The pistons move the support plate 48 transversely with reference to the axis of travel of the processed bottles. Joined to the plate 48 are yoke plates 52 and 54 on top of which is secured an arm 56.

Referring to FIG. 8, dual pneumatic cylinders 60 and 62 are mounted to the arm 56. They rotate a drive shaft 64 (clockwise counterclockwise) which shaft carries a gear 66. The gear 66 meshes with a gear 68 which is staked to a shaft 70. The shaft 70 is journaled through the yoke plates 52-54.

Plates 72 and 74 are staked or otherwise secured to the shaft 70. These plates secure a pneumatic angular gripper therebetween, such as a phd 8600 series angular gripper. These grippers include jaws 82 and 84.

Clamps 90a and 90b are joined to the lower ends of the jaws 82 and 84 respectively. The cylinders 82 and 84 effect the opening and closing of the clamps 90 and 92.

The clamps 90a and 90b have jaws 92a–92c and 92b–92c which define openings 94a–94d and 94b and 94d therebetween. Opposed jaws 92a–92c when closed engage the flashing of a top.

The control 50 is shown schematically in FIG. 7. It includes the timing mechanisms, etc. to effect the sequence of operations to be described in the operation of the invention. The pneumatic cylinders, per se, described herein are not unique and their use to effect the operation of the invention is well within the skill of the art.

Referring to FIG. 10, a set 200 of four bottles discharged from the machine 20 has flashing, as previously described, on the top portion thereof. A second set 202 of bottles is shown with the flashing engaged by the clamps 90a and 90b. A third set 204 of bottles downstream of the clamps 90 and 92 has had the flashing removed.

In the operation of the invention, after the bottles 10 have been formed in the machine 22, the structure 24a closes the walls 32a, nesting the bottles and the bottles move out of the machine and into alignment with the clamping assembly, FIG. 11a. After they have travelled the predetermined distance to be in alignment with the clamping assembly, the clamps 90a and 90b close, engaging the flashing as shown in FIG. 11b. After the flashing has been clamped by the jaws, the shaft 70 is driven causing rotation of the clamps 90a and 90b removing the flashing, FIG. 11c. The pistons 44–46 then move the clamping assembly 40 transversely with reference to the line of travel of the bottles and the clamps open, discarding the flashing, FIG. 11d. The clamping assembly 40 then returns to its original position with the clamps in their open position, FIG. 11e. The bottle moves downstream of the clamping assembly, the housing moves into the machine to acquire the next set of bottles and moves them into alignment with the clamping assembly.

Although the invention has been described with reference to pneumatic cylinders, specific structures to effect the opening and closing of the clamps, movement of the clamping assembly etc., other structural modifications may be made to the apparatus described herein without departing from the scope of the invention.

Having described my invention, what I now claim is:

1. A method for removing flashing from low density plastic bottle wherein the flashing is joined to the top and neck of the bottles along a juncture which comprises in sequence:
   (a) nesting a first bottle(s) in a housing;
   (b) moving the housing with the nested bottle(s) along a first axis;
   (c) engaging the flashing with jaws which clamp the flashing along the juncture of the flashing with the nested bottle(s);
   (d) rotating the jaws about an axis parallel to the first axis while the bottle(s) is nested in the housing to remove the flashing from the bottle(s);
   (e) opening the jaws to discharge the flashing;
   (f) releasing the bottle from the housing; and
   (g) repeating sequentially steps (a) through (f) on a second bottle(s) having flashing joined to its top and neck.

2. The method of claim 1 which includes:
   nesting the bottle in the housing such that substantially the entire surface area of the bottle(s) is received in contacting engagement with the housing.

3. The method of claim 1 which includes:
   moving the housing along the first axis from a first too a second position;
   removing the flashing from the bottles while the housing is in the second position;
   releasing the bottle(s) from the housing in the second position; and
   moving the housing from the second to the first position.

* * * * *